(12) United States Patent
Kim

(10) Patent No.: US 8,211,220 B2
(45) Date of Patent: Jul. 3, 2012

(54) PAINT COMPOSITION HAVING SILICATE RESIN

(75) Inventor: Dong-Sun Kim, Gangneung-si (KR)

(73) Assignee: Si Chem Co., Ltd, Gangwon-do (KR)

( * ) Notice: Subject to any disclaimer, the term of this patent is extended or adjusted under 35 U.S.C. 154(b) by 0 days.

(21) Appl. No.: 12/782,251

(22) Filed: May 18, 2010

(65) Prior Publication Data

US 2010/0234512 A1 Sep. 16, 2010

(30) Foreign Application Priority Data

Nov. 23, 2007 (KR) .................. 10-2007-0120271

(51) Int. Cl.
*C09D 175/06* (2006.01)
(52) U.S. Cl. .................. 106/14.05; 106/14.37; 252/502; 252/507; 252/511
(58) Field of Classification Search .................. 252/502, 252/507, 511; 106/14.05, 14.37
See application file for complete search history.

(56) References Cited

U.S. PATENT DOCUMENTS

| | | | | | |
|---|---|---|---|---|---|
| 4,108,811 | A | * | 8/1978 | Eckhoff ........................ | 524/405 |
| 5,246,654 | A | * | 9/1993 | Ertle et al. .................... | 264/118 |
| 5,356,716 | A | * | 10/1994 | Patel .......................... | 428/423.1 |
| 6,015,855 | A | * | 1/2000 | Dalton ......................... | 524/442 |
| 6,114,440 | A | | 9/2000 | Yamaya et al. ................ | 524/865 |
| 6,793,729 | B2 | * | 9/2004 | Lee ............................. | 106/600 |
| 2004/0186201 | A1 | | 9/2004 | Stoffer et al. ................. | 523/215 |
| 2006/0086281 | A1 | * | 4/2006 | Poulet et al. ................. | 106/14.5 |
| 2009/0005494 | A1 | * | 1/2009 | Luo et al. ..................... | 524/502 |

FOREIGN PATENT DOCUMENTS

| KR | 10-1993-0007349 | 8/1993 |
|---|---|---|
| KR | 10-0573492 | 4/2006 |

OTHER PUBLICATIONS

Machine translated English equivalent of KR 10-0573492, Apr. 2006, 11 pages.*
Machine translated English equivalent of CN 1403516, Mar. 2003, 4 pages.*
International Search Report, Written Opinion, and International Preliminary Report on Patentability from PCT Application PCT/KR2008/006052.

* cited by examiner

*Primary Examiner* — David Buttner
*Assistant Examiner* — Brieann R Fink
(74) *Attorney, Agent, or Firm* — Harness, Dickey & Pierce, P.L.C.; Anthony G. Fussner; Kisuk Lee

(57) ABSTRACT

A functional paint composition prevents a power loss caused by corrosion of a structure with high voltage electric current. The paint composition includes, by weight, an acrylic urethane resin of 100 parts as a principal resin, with a potassium silicate resin of 5 to 20 parts, an auxiliary resin of 5 to 10 parts, a functional pigment of 100 to 250 parts, and functional additives of 1 to 2 parts. Accordingly, in embodiments of the disclosure, causes of a negative influence on high voltage electric current not solved in general paint are eliminated, and the economy is considered being applicable to all kinds of materials and composition layers of objects to be coated, thereby providing an effect even in a repair coating for electrical lines and stuck-metal parts having electric current and structures not having an electric current, i.e., steel tower, bridge, storage tanks, steel structures and coating panels, etc.

9 Claims, No Drawings

US 8,211,220 B2

PAINT COMPOSITION HAVING SILICATE RESIN

CROSS-REFERENCE TO RELATED APPLICATIONS

This application is a continuation of PCT Application No. PCT/KR2008/006052 filed on Oct. 15, 2008, which claims the benefit and priority to Korean Patent Application No. 10-2007-0120271, filed Nov. 23, 2007. The entire disclosures of the applications identified in this paragraph are incorporated herein by reference.

FIELD

The present disclosure relates to a functional paint composition to prevent power loss caused by corrosion of a structure having high voltage electric current.

The present disclosure relates to a functional paint composition capable of preventing power loss caused by corrosion of a structure having high voltage electric current. More particularly, the present disclosure relates to a paint composition comprising, by weight, a modified urethane-system resin of 100 parts as a principal resin, with an inorganic potassium silicate resin of 10 to 20 parts, an auxiliary resin of 10 to 40 parts, a functional pigment of 100 to 250 parts, and functional additives of 1 to 2 parts.

BACKGROUND

In general, paint is a material used to protect the surface of objects, to change the appearance or outer shape of objects, to effect radiation, reflection and absorption of wavelength, and to intercept an electromagnetic wave, etc. Paint generally refers to chemicals in a fluid state to obtain a given effect from the objects by covering the surface of the object with the chemicals and, thus, forming a dried coating layer thereon.

A coating generally refers to the total work of forming a coating film or layer on the surface of the object by using paint. Paint itself is called a chemical, but the value of paint is obtained when being coated and thus formed as a coating film having a given function.

Heavy duty coatings refer to paint capable of resisting a severely corrosive environment through a longer period of time by protecting, for example, bridges, steel towers, marine structures, and a large part of structures in various power plants, ships or other steel structures from severely corrosive environments.

General coating and heavy duty coating of a steel structure are obtained by using a zinc dust paint on a first layer as a lower layer, an epoxy paint on a second layer as a middle layer, and an urethane paint on a third layer as an upper layer. Galvanized structures, such as a power transmission tower, are coated by using etching primer as a first layer, an epoxy paint as a second layer, and an urethane paint as a third layer. Accordingly specific specifications of paint are used depending on the materials of the respectively targeted structures. In a repair coating, a specific working process and a specific specification of paint are applied according to the kind of composition layers. Furthermore, in general coating and heavy duty coating, respective procedures must be performed stepwise and then, after a lapse of given time, middle and upper coatings must be performed, thus causing the inconvenience of using at least three kinds of paints five or six times in a roller coating.

In high voltage electrical lines and stuck-metal parts, etc., of a structure having high voltage electric current, serious corrosion and adhesion of pollution materials occur due to a consistent increase in acid rain, its increased frequency, and an increased level of air pollution, etc., thus causing not only an enormous power loss from increased electrical resistance but also environmental pollution from the increased friction layer, wind noise, corona discharge, etc. At present, there is a very great need to solve these problems, but there is no paint capable of being applied to structures having a direct high voltage electric current.

Therefore, there is an urgent need in the corresponding industrial field to develop a paint composition that is relatively dominant in ensuring convenient execution and shortened execution period compared with general-purpose paint compositions, and that is capable of being applied to all materials of targeted objects and all kinds of composition layers, and, furthermore, to develop an effacacious paint composition that does not interfere with electric current, even in structures having a direct high voltage electric current.

Accordingly, some embodiments of the disclosure provide a paint composition improved in a corrosion prevention and anti-weathering without a negative influence on electric current. The paint composition has a relatively simple execution procedure and is capable of being applied to all materials of targeted things and all kinds of composition layers in a repair coating without influencing the electric current of structures having a direct high voltage electric current.

According to an embodiment of the disclosure, a silicate urethane paint composition with an addition of silicate resin to prevent corrosion of a structure and a power loss comprises, by weight, an improved urethane-system resin of 100 parts as a principal resin, together with a silicate resin 10 to 20 parts, an auxiliary resin of 10 to 40 parts, a functional pigment of 100 to 250 parts, and a functional additive of 1 to 2 parts.

The silicate resin may have a solid content range of 20 to 55 parts by weight. The auxiliary resin may be a silicone resin and may have additional silicate resin to prevent a power loss and corrosion of a structure.

The functional pigment may contain, by weight, $TiO_2$ of 40 to 50 parts, $Al_2O_3$ of 30 to 50 parts, graphite of 20 to 80 parts, and crosslinkable polystyrene of 10 to 30 parts.

The functional additive may contain at least any one of a dispersing agent used in mixing an improved urethane resin as a principal resin with a silicate resin as an aqueous resin and a dispersing agent necessary for dispersing a functional pigment into a resin.

In the silicate resin, when a molar ratio of $SiO_2/K_2O$ is 4.0 to 6.0, articles with a solid content of 20 to 35 parts by weight may be used, and when the molar ratio is less than 4.0, soluble hydrosilica gel may be used with water.

A paint composition according to an embodiment of the disclosure can provide a relatively simple execution procedure, and is adaptable to all kinds of composition layers for targeted objects formed of all kinds of materials and repair coating, but without influencing electric current in a structure having a direct high voltage electric current and with enhanced corrosion prevention and enhanced anti-weathering.

DETAILED DESCRIPTION

Embodiments of the present disclosure now will be described more fully hereinafter. This disclosure may, however, be embodied in many different forms and should not be construed as limited to the embodiments set forth herein. Rather these embodiments are provided so that this disclosure will be thorough and complete, and will fully convey the scope of the disclosure to those skilled in the art.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Exemplary embodiments of the present disclosure are more fully described below. This disclosure may, however, be embodied in many different forms and should not be construed as being limited to the exemplary embodiments set forth herein; rather, these exemplary embodiments are provided so that this disclosure is thorough and complete, and conveys the concept of the disclosure to those skilled in the art.

An improved urethane-system resin as a principal ingredient according to an embodiment of the disclosure is principally provided as acrylic urethane resin, and has acrylic resin and isocyanate as principal ingredients, and is very adhesive, anti-weathering and chemical-resistant, and furthermore, also has re-coating, smoothness, luster and color maintenance characteristics. Accordingly, the improved urethane-system resin is principally used as principal ingredients of paint for various uses of household electric appliances, industrial machines, general industrial uses, etc.

As silicate resin as another ingredient according to an embodiment of the disclosure, Kasil is used, which is the name of a product produced in PQ Ltd. and which has a solid content of 20-35 parts by weight when a molar ratio of $SiO_2/K_2O$ is 4.0 to 6.0. When the molar ratio is under 4.0, a soluble hydrosilica gel as PM produced in PQ Ltd. is used with water.

Silicone resin as an auxiliary resin is material dominant in a heat resistance, cold-proof, anti-weathering, resistance to flame, electrical characteristic, slip characteristic, heterogeneous characteristic, and water-repellent characteristic, and is variously used.

A functional pigment as a principal ingredient is used to obtain a function of not interfering with electric current according to an embodiment of the disclosure, including a mutual stabilization between adhesive pollution material and rust applied on a surface of a targeted object, corrosion prevention and anti-weathering, rather than to color pigment in order to get a desired color from paint. A functional pigment comprises herein $TiO_2$, $Al_2O_3$, graphite, crosslinkable polystyrene, etc.

The dispersing agent, as a functional additive used in an embodiment of the disclosure, is adsorbed on a surface of the pigment and increases humidity for the pigment vehicle, thus providing relatively easy dispersion of the pigment among vehicles as a kind of surface active agent. The dispersing agent is used together with a general purpose organic dispersing agent and carboxymethyl cellulose (hereafter, referred to as 'CMC') as a dispersing agent used in mixing a silicate resin as an aqueous resin with acrylic urethane resin.

EXAMPLES

Some embodiments of the disclosure will be described more in detail as follows, without limiting to the embodiments and without deviating from the scope of the disclosure.

Example 1

Decision on Mix Proportion of Functional Paint Composition

A paint composition according to an embodiment of the disclosure is produced with ingredients and contents written in the following Table 1, and the functional paint composition is abbreviated herein as SFMU-310.

In an embodiment of the disclosure, silicate resin of 10 to 20 parts by weight is used for an acrylic urethane resin of 100 parts by weight. Silicate resin is used to bind conductive coating material to obtain relatively better electric current, anti-weathering, anti-corrosion because these functions cannot be sufficiently effected at 10 parts by weight or below, and at 20 parts by weight or more it is difficult to disperse the acrylic urethane resin; furthermore, a paint film of paint is too strong to cause a drop of impact resistance.

In the embodiment of the disclosure, a silicone resin as the auxiliary resin is used with 10 to 40 parts by weight. Defects for a high-temperature resistance of paint are caused at 10 parts by weight or below, and at 40 parts by weight or more the cost of paint increases. Accordingly, in an embodiment of the disclosure, the most effective content of silicone resin is 10 to 40 parts by weight at 300 degrees Centigrade as a use temperature range of paint.

In the embodiment of the disclosure, a functional pigment is used with 100 to 250parts by weight. Electrical resistance and heat resistance reduction, rust stabilization function, etc., as the functions of the functional pigment cannot be sufficiently effected at 100 parts by weight or below. At 250 parts by weight or more the specific gravity and viscosity of paint are too great and a cost of paint is too high. $TiO_2$, $Al_2O_3$, graphite and crosslinkable polystyrene used herein as the functional pigment are employed at 250 parts by weight total. However, in considering the specific gravity and viscosity of paint, the sum of functional pigments may not exceed 150 parts by weight beneficially.

The content of dispersing agent as the functional additive is provided by considering electrical efficiency within a range the dispersion can become smoothened.

TABLE 1

| Ingredients | Composition | Content (by weight) |
| --- | --- | --- |
| Principal resin | Acrylic urethane resin | 100 parts |
| | Inorganic potassium silicate resin | 10-20 parts |
| Auxiliary resin | Silicon resin | 10-40 parts |
| Functional pigment | $TiO_2$ | 40-50 parts |
| | $Al_2O_3$ | 30-50 parts |
| | Graphite | 20-80 parts |
| | Crosslinkable polystyrene | 10-30 parts |
| | Other added pigment | 1-3 parts |
| Functional additive | CMC, Surface active agent, etc. | 1-2 parts |

Example 2

Production of SFMU-310 Paint Composition

A paint composition is produced by evenly mixing acrylic urethane resin of 1 kg, potassium silicate resin of 150 g, auxiliary resin of 150 g, functional pigment with $TiO_2$ of 400 g, $Al_2O_3$ of 300 g, graphite of 500 g and crosslinkable polystyrene of 100 g, other additives of 10 g and a dispersing agent of 10 g.

Example 3

Effect of SFMU-310 Paint

A functional paint composition produced in the second embodiment is compared with the function of paint composition disclosed in Korean Patent No. 10-0573492 and has been confirmed for its remarkably excellent execution simplicity, economy and performance as compared with existing general paint; and the paint composition according to some embodiments of the disclosure has been enhanced in performance as compared with the existing paint composition. The enhanced performance of a paint composition according to some embodiments of the disclosure is as follows, with a brief description.

First, in a condition that an equal or more function can be effected, a thickness of a paint film for paint is 50 μm in an embodiment of the disclosure, and is 75-100 μm in the existing paint, that is, it is reduced by 25% to 50% according to embodiments of the disclosure. Such reduction is effective not only in an economic aspect, but also in an entire structural aspect of power transmission facilities with a relative reduction of unit weight in high voltage electrical lines and stuck-metal parts.

Secondly, in a composition of paint, a silicate resin is principally used to bind of conductive coating material, and graphite particles are principally used as a conductive functional pigment. This use is to obtain not only a dominant anti-weathering and heat resistance of silicate resin, but also a reduction of electrical resistance and enhanced-thermal conduction. The reduction of electrical resistance reduces power loss, and enhanced thermal conduction enhances thermal conduction generated in a conductor, thereby reducing problems caused by temperature increase of the conductor.

Thirdly, according to materials of targeted objects and the kind of composition layers thereof, the targeted objects can be extended to objects that are impossible for their use with existing paint. This may be very useful for execution convenience and a use of paint from an aspect that a large part of facilities, including power transmission and power plant, are formed of a plurality of materials or composition layers of many kinds.

Fourthly, a measurement for a corrosion prevention is a current impending subject since from an electrical characteristic aspect, power loss caused by corrosion of a structure having electric current, environmental pollution caused by aeolian noise, and corona discharge become very serious by recently increased acid rain consistency and frequency and increased air pollution, etc. As one of the most convenient methods, there may be a corrosion prevention using a coating, but this may negatively influence electric current or cause the problem of a tendency toward high temperature. Electrical resistance of a conductor already having a progression of corrosion generally causes increased resistance of a maximum 30% as compared with a new conductor. Furthermore, increased friction noise and increased corona discharge noise have a relatively very high correlation therewith. From such aspect, paint according to an embodiment of the disclosure has a minute increase of 1.5% to 3.5% in an electrical resistance; meanwhile the existing paint causes a resistance increase approximate to a conductor having a corrosion progression of about 11.5% to about 23%. Thermal conductivity according to an embodiment of the disclosure has 0.11 W/m·K as the enhanced result twice the existing paint of 0.05 W/m·K, or more.

It will be apparent to those skilled in the art that modifications and variations can be made in the present disclosure without deviating from the spirit or scope of the disclosure. Thus, it is intended that the present disclosure cover any such modifications and variations of this disclosure provided they come within the scope of the appended claims and their equivalents. Accordingly, these and other changes and modifications are seen to be within the true spirit and scope of the disclosure as defined by the appended claims.

What is claimed is:

1. A silicate urethane paint composition comprising, by weight:
   about 100 parts of a urethane resin,
   about 10 to about 20 parts of a silicate resin,
   about 10 to about 40 parts of an auxiliary resin comprising a silicone resin,
   about 100 to about 250 parts of a functional pigment, and
   about 1 to about 2 parts of a functional additive comprising a dispersing agent,
   wherein the functional pigment comprises about 40 to about 50 parts of $TiO_2$, about 30 to about 50 parts of $Al_2O_3$, about 20 to about 80 parts of graphite, and about 10 to about 30 parts of crosslinkable polystyrene.

2. The composition of claim 1, wherein the silicate resin comprises about 20 to about 55 parts of a solid content; and the functional pigment comprises about 40 to about 50 parts of $TiO_2$, about 30 to about 50 parts of $Al_2O_3$, about 20 to about 80 parts of graphite, and about 10 to about 30 parts of crosslinkable polystyrene.

3. The composition of claim 1, wherein the silicate resin comprises a potassium silicate resin and a molar ratio of $SiO_2/K_2O$ is about 4.0 to about 6.0, and the silicate resin comprises about 20 to about 35 parts of a solid content.

4. The composition of claim 1, wherein the silicate resin comprises a potassium silicate resin and a molar ratio of $SiO_2/K_2O$ is less than about 4.0, and the silicate resin comprises soluble hydrosilica gel.

5. A method for preventing corrosion of a structure without influencing an electrical flow in the structure, the method comprising:
   applying a silicate urethane paint composition to the structure, wherein the composition comprises, by weight:
   about 100 parts of a urethane resin,
   about 10 to about 20 parts of a silicate resin,
   about 10 to about 40 parts of a silicone resin,
   about 100 to about 250 parts of a functional pigment wherein the functional pigment comprises about 40 to about 50 parts of $TiO_2$, about 30 to about 50 parts of $Al_2O_3$, about 20 to about 80 parts of graphite, and about 10 to about 30 parts of crosslinkable polystyrene, and
   about 1 to about 2 parts of a functional additive comprising a dispersing agent.

6. The method of claim 5, wherein the silicate resin comprises a potassium silicate resin.

7. The method of claim 5, wherein the silicate resin comprises about 20 to about 55 parts of a solid content.

8. The method of claim 6, wherein a molar ratio of $SiO_2/K_2O$ of the composition is about 4.0 to about 6.0, and the silicate resin comprises about 20 to about 35 parts of a solid content.

9. The method of claim 6, wherein a molar ratio of $SiO_2/K_2O$ of the composition is less than about 4.0, and the silicate resin comprises soluble hydrosilica gel.

* * * * *